(12) United States Patent
Wang

(10) Patent No.: US 10,757,033 B2
(45) Date of Patent: Aug. 25, 2020

(54) TRAFFIC CONTROL METHOD, TRAFFIC CONTROL APPARATUS AND SERVER

(71) Applicant: TENCENT TECHNOLOGY (SHENZHEN) COMPANY LIMITED, Shenzhen, Guangdong (CN)

(72) Inventor: Xiaohai Wang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 260 days.

(21) Appl. No.: 15/663,127

(22) Filed: Jul. 28, 2017

(65) Prior Publication Data

US 2017/0331757 A1    Nov. 16, 2017

Related U.S. Application Data

(63) Continuation of application No. PCT/CN2016/084025, filed on May 31, 2016.

(30) Foreign Application Priority Data

Jun. 30, 2015    (CN) .......................... 2015 1 0374358

(51) Int. Cl.
*H04L 12/875*    (2013.01)
*H04L 12/26*    (2006.01)
*H04L 12/927*    (2013.01)

(52) U.S. Cl.
CPC .......... *H04L 47/56* (2013.01); *H04L 43/0852* (2013.01); *H04L 43/0876* (2013.01); *H04L 47/805* (2013.01); *H04L 43/0894* (2013.01)

(58) Field of Classification Search
CPC ....... H04L 47/56; H04L 43/0852–0858; H04L 43/0876; H04L 43/16; H04L 47/805; H04L 43/0894
See application file for complete search history.

(56) References Cited

U.S. PATENT DOCUMENTS

| 8,787,165 B2 | 7/2014 | Shrum |
| 2010/0110892 A1* | 5/2010 | Lai .......................... H04L 47/10 370/235 |

(Continued)

FOREIGN PATENT DOCUMENTS

| CN | 1878094 A | 12/2006 |
| CN | 102231898 A | 11/2011 |

(Continued)

OTHER PUBLICATIONS

International Search Report received in International Application No. PCT/CN2016/084025 dated Aug. 2, 2016, dated Aug. 24, 2016 in 2 pages.

*Primary Examiner* — Eric Myers
(74) *Attorney, Agent, or Firm* — Anova Law Group, PLLC

(57) ABSTRACT

Disclosed are a traffic control method, a traffic control apparatus and a server. In some embodiments, the method includes: determining, by a device on a network side, a first queue delay based on transceiving time of a communication data packet currently received from a user terminal and transceiving time of a communication data packet received from the user terminal last time; adjusting a first quality of service parameter based on the first queue delay, a second queue delay stored by the device on the network side and a reception data volume of the device on the network side, to obtain a second quality of service parameter; and transmitting the second quality of service parameter to the user terminal, and the user terminal transmits subsequent communication data packets based on the second quality of service parameter.

9 Claims, 8 Drawing Sheets

(56) References Cited

U.S. PATENT DOCUMENTS

2015/0189659 A1 7/2015 Mussot
2017/0048124 A1* 2/2017 Nishikawa .......... H04L 43/0882

FOREIGN PATENT DOCUMENTS

| CN | 102868666 A | 1/2013 |
| CN | 104243102 A | 12/2014 |
| WO | WO 2013/186502 A1 | 12/2013 |

* cited by examiner

TRAFFIC CONTROL METHOD, TRAFFIC CONTROL APPARATUS AND SERVER

The present application is a continuation of International Patent Application No. PCT/CN2016/084025, filed on May 31, 2016, which claims priority to Chinese Patent Application No. 201510374358.5, titled "TRAFFIC CONTROL METHOD AND TRAFFIC CONTROL APPARATUS", filed on Jun. 30, 2015 with the State Intellectual Property Office of People's Republic of China, both of which are incorporated herein by reference in their entireties.

FIELD

The present disclosure relates to the technical field of a computer, and in particular to a traffic control method, a traffic control apparatus and a server.

BACKGROUND

With rapid development of the technology, more and more application programs for communication appear, and the application programs may be installed in terminals such as a mobile phone, a computer or a tablet computer. When the terminal is to communicate by the application programs, the terminal needs to be connected to an internet and occupy a certain network bandwidth of the internet. Since the network bandwidth is limited, network congestion may occur when many communication data packets are transmitted during a communication process. Therefore, in order to utilize the limited network bandwidth better, it needs to control traffics for communication data packets to be transmitted.

Presently, a process of controlling a traffic includes: when multiple user terminals communicate with each other, the multiple user terminals transmit respective communication capability information, such as a packet loss rate, network jitter and a type of a connected network, to a server; when receiving the communication capability information transmitted by the multiple user terminals, the server may set a Quality of Service (Qos) parameter for each of the multiple user terminals based on the communication capability information transmitted by the multiple user terminals, and transmit the Qos parameter to a respective user terminal. When receiving the Qos parameter transmitted by the server, the user terminal may transmit a communication data packet to the server based on the Qos parameter; and when receiving the communication data packet, the server forwards the communication data packet to other user terminals among the multiple user terminals, thereby controlling the traffic.

The Qos parameters of the multiple user terminals during the communication process are fixed, therefore loss of the communication data packet may occur once network congestion occurs, thereby resulting in that a communication effect of the multiple user terminals is deteriorated.

SUMMARY

In view of above, a traffic control method and a traffic control apparatus are provided according to embodiments of the present disclosure.

In an aspect, a traffic control method is provided, which includes:

determining, by a device on a network side, a first queue delay based on transceiving time of a communication data packet currently received from a user terminal and transceiving time of a communication data packet received from the user terminal last time, where the first queue delay is queuing time of the currently received communication data packet in a buffer queue of a router;

adjusting a first quality of service parameter based on the first queue delay, a second queue delay stored by the device on the network side and a reception data volume of the device on the network side, to obtain a second quality of service parameter, where the first quality of service parameter is a quality of service parameter initially set for the user terminal by the device on the network side, the second queue delay is queuing time of the communication data packet received last time in the buffer queue of the router, and the reception data volume is a data volume of the currently received communication data packet or a data volume received by the device on the network side from the user terminal in a specified time interval; and transmitting the second quality of service parameter to the user terminal, such that the user terminal transmits the communication data packet based on the second quality of service parameter.

In another aspect, a traffic control apparatus applied to a device on a network side is provided, which includes: one or more processors; and a memory in which multiple program modules are stored, where the multiple program modules includes:

a determining module configured to determine a first queue delay based on transceiving time of a communication data packet currently received by the device on the network side from a user terminal and transceiving time of a communication data packet received by the device on the network side from the user terminal last time, where the first queue delay is queuing time of the currently received communication data packet in a buffer queue of a router;

an adjusting module configured to adjust a first quality of service parameter based on the first queue delay, a second queue delay stored by the device on the network side and a reception data volume of the device on the network side, to obtain a second quality of service parameter, where the first quality of service parameter is a quality of service parameter initially set for the user terminal by the device on the network side, the second queue delay is queuing time of the communication data packet received last time in the buffer queue of the router, and the reception data volume is a data volume of the currently received communication data packet or a data volume received by the device on the network side from the user terminal in a specified time interval; and a transmitting module configured to transmit the second quality of service parameter to the user terminal, such that the user terminal transmits the communication data packet based on the second quality of service parameter.

In another aspect, a server is provided, where the server is connected to a user terminal over a network and is configured to:

initially set a first quality of service parameter for the user terminal;

determine a first queue delay of a first communication data packet received from the user terminal in a buffer queue of a router, where the user terminal transmits the first communication data packet based on the first quality of service parameter;

determine a second queue delay of a second communication data packet received from the user terminal in the buffer queue of the router, where the user terminal transmits the second communication data packet based on the first quality of service parameter, and the first communication packet is transmitted immediately after the second communication data packet is transmitted;

adjust the first quality of service parameter based on the first queue delay, the second queue delay and a reception data volume of the server, to obtain a second quality of service parameter, where the reception data volume is a data volume of the first communication data packet or a data volume received by the server from the user terminal in a specified time interval; and transmit the second quality of service parameter to the user terminal, such that the user terminal transmits subsequent communication data packets based on the second quality of service parameter.

BRIEF DESCRIPTION OF THE DRAWINGS

In order to illustrate technical solutions in embodiments of the present disclosure more clearly, drawings for the description of the embodiments are introduced simply. Apparently, the drawings described in the following only describe some embodiments of the present disclosure, and other drawings may be obtained according to the drawings by those skilled in the art without any creative work.

DETAILED DESCRIPTION OF EMBODIMENTS

In order to make objects, technical solutions and advantages of the present disclosure become more clearly, embodiments of the present disclosure are further described in detail in conjunction with drawings hereinafter.

Figure 1:
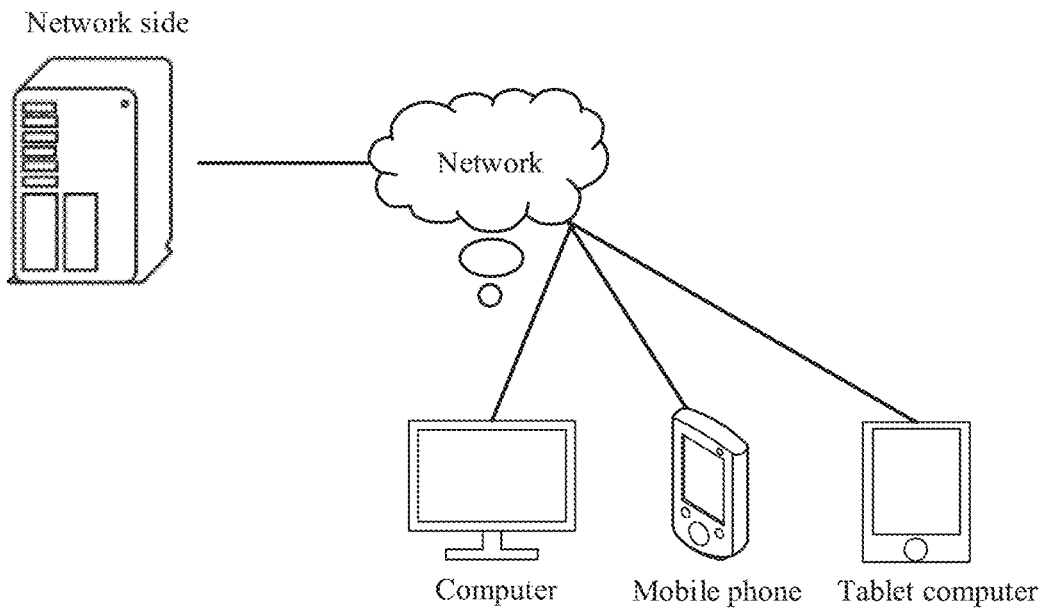
FIG. 1 is an architecture diagram of a traffic control system according to an embodiment of the present disclosure.

FIG. 1 is an architecture diagram of a traffic control system according to an embodiment of the present disclosure. The system includes a network side and multiple user terminals, and the network side is connected to the multiple user terminals over a network.

In some embodiments, the multiple user terminals are configured to transmit respective communication capability information to the network side and receive a quality of service parameter set for each of the multiple user terminals by the network side based on the communication capability information of the user terminal. Then, the multiple user terminals are further configured to transmit communication data packets to the network side based on the quality of service parameters set by the network side. The network side is configured to receive the communication capability information transmitted by the multiple user terminals and set quality of service parameters for the multiple user terminals and transmit the quality of service parameters to the multiple user terminals respectively. The network side is further configured to receive a communication data packet transmitted by one of the multiple user terminals and forward the communication data packet to other user terminals among the multiple user terminals, thereby implementing communication between the multiple user terminals.

In addition, in another embodiment, when the multiple user terminals are to communicate, the multiple user terminals may create a communication group. Then, one of the multiple user terminals transmit a communication data packet to the network side through the communication group, and the network side forwards the communication data packet to other user terminals in the communication group, thereby implementing communication between the multiple user terminals through the communication group. The communication between the multiple user terminals may be audio communication or video communication, that is, the multiple user terminals may transmit a communication data packet for audio communication to the network side, or may transmit a communication data packet for video communication.

Figure 2:
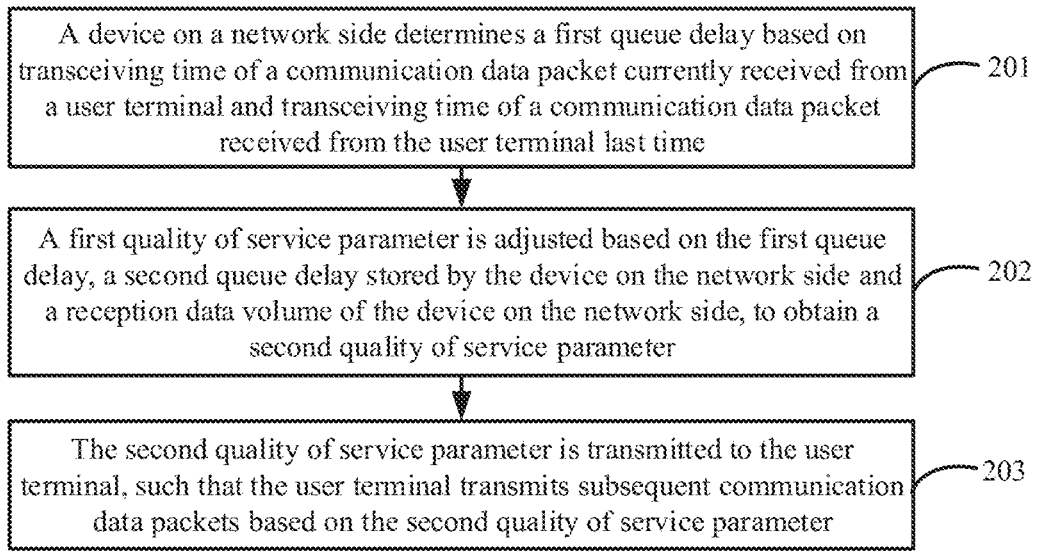
FIG. 2 is a flowchart of a traffic control method according to an embodiment of the present disclosure.

FIG. 2 shows a traffic control method according to an embodiment of the present disclosure. As shown in FIG. 2, the method includes steps 201 to 203.

In step 201, a device on a network side determines a first queue delay based on transceiving time of a communication data packet currently received from a user terminal and transceiving time of a communication data packet received from the user terminal last time, where the first queue delay is queuing time of the currently received communication data packet in a buffer queue of a router.

In step 202, a first quality of service parameter is adjusted based on the first queue delay, a second queue delay stored by the device on the network side and a reception data volume of the device on the network side, to obtain a second quality of service parameter, where the first quality of service parameter is a quality of service parameter initially set for the user terminal by the device on the network side, the second queue delay is queuing time of the communication data packet received last time in the buffer queue of the router, and the reception data volume is a data volume of the currently received communication data packet or a data volume received by the device on the network side from the user terminal in a specified time internal.

It should be understood that, the user terminal transmits the communication data packet based on the first quality of service parameter initially set by the device on the network side, and thus the device on the network side determines a network status according to a situation (such as a queue delay and a data volume) of the communication data packet transmitted by the user terminal based on the first quality of service parameter, and adjusts the first quality of service parameter to a second quality of service parameter accordingly.

In step 203, the second quality of service parameter is transmitted to the user terminal, such that the user terminal transmits subsequent communication data packets based on the second quality of service parameter.

Optionally, the user terminal may be one of multiple user terminals coupled to the device on the network side, and the multiple user terminals perform network communication with the device on the network side simultaneously.

With the method according to the embodiment of the present disclosure, the network side determines the first queue delay based on the transceiving time of the currently received communication data packet and the transceiving time of the communication data packet received last time; the network side adjusts the first quality of service parameter based on the first queue delay, the stored second queue delay and the reception data volume, to obtain the second quality of service parameter and transmits the second quality of service parameter to the user terminal, such that the user terminal transmits the communication data packet based on the second quality of service parameter. Therefore, the network side can adaptively adjust the multiple user terminals in response to real-time change of a network, thereby avoiding network congestion and improving a communication quality in a case of multi-user communication, in a case that the network bandwidth is limited.

Optionally, the determining a first queue delay may include:

determining a first difference between receiving time of the currently received communication data packet and receiving time of the communication data packet received last time, as a receiving time interval;

determining a second difference between transmitting time of the currently received communication data packet and transmitting time of the communication data packet received last time, as a transmitting time interval; and determining a third difference between the receiving time interval and the transmitting time interval, as the first queue delay.

Optionally, the adjusting a first quality of service parameter to obtain a second quality of service parameter may include:

determining a network status of the user terminal based on the first queue delay and the stored second queue delay;

predicting a network bandwidth of the user terminal based on the network status of the user terminal and the reception data volume; and adjusting the first quality of service parameter based on the network status and the network bandwidth of the user terminal, to obtain the second quality of service parameter.

Optionally, the determining a network status of the user terminal based on the first queue delay and the stored second queue delay may include:

in a case that the first queue delay is equal to the second queue delay, determining that the network status of the user terminal is a normal status; and in a case that the first queue delay is not equal to the second queue delay:

determining a fourth difference between the first queue delay and the second queue delay to obtain a delay duration; and determining the network status of the user terminal based on the first queue delay, the second queue delay and the delay duration.

Optionally, the determining the network status of the user terminal based on the first queue delay, the second queue delay and the delay duration may include:

determining whether the delay duration is greater than or equal to a first threshold in a case that the first queue delay is greater than the second queue delay;

determining that the network status of the user terminal is an overload status in a case that the delay duration is greater than or equal to the first threshold; and determining that the network status of the user terminal is a normal status in a case that the delay duration is less than the first threshold;

determining whether the delay duration is greater than or equal to a second threshold in a case that the first queue delay is less than the second queue delay; and determining that the network status of the user terminal is an idle status in a case that the delay duration is greater than or equal to the second threshold; and determining that the network status of the user terminal is a normal status in a case that the delay duration is less than the second threshold.

Optionally, the predicting a network bandwidth of the user terminal based on the network status of the user terminal and the reception data volume may include:

dividing a data volume transmitted by the user terminal which is received in a specified time interval by a length of the specified time interval to obtain a reference bandwidth, in a case that the reception data volume is the data volume received by the device on the network side from the user terminal in the specified time interval;

multiplying the reference bandwidth by a first bandwidth coefficient to obtain the network bandwidth of the user terminal, in a case that the network status of the user terminal is an overload status;

multiplying the reference bandwidth by a second bandwidth coefficient to obtain the network bandwidth of the user terminal, in a case that the network status of the user terminal is an idle status; and determining the reference bandwidth as the network bandwidth of the user terminal, in a case that the network status of the user terminal is a normal status.

All optional technical solutions described above may be combined in any manner to form optional embodiments of the present disclosure, which are not described in detail in the present disclosure.

Figure 3:
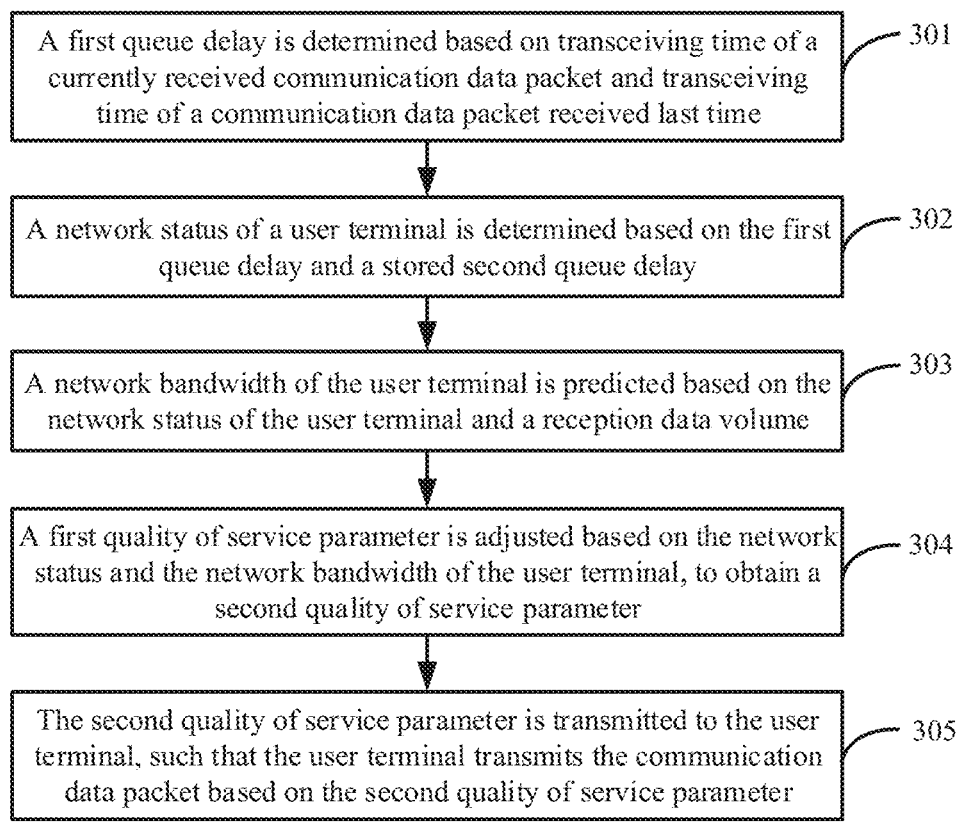
FIG. 3 is a flowchart of another traffic control method according to an embodiment of the present disclosure.

FIG. 3 shows a traffic control method according to an embodiment of the present disclosure. As shown in FIG. 3, the method includes step 301 to step 305 in the following.

In step 301, a first queue delay is determined based on transceiving time of a communication data packet currently received and transceiving time of a communication data packet received last time, where the first queue delay is queuing time of the currently received communication data packet in a buffer queue of a router.

The transceiving time of the currently received communication data packet refers to receiving time and transmitting time of the currently received communication data packet. The transceiving time of the communication data packet received last time refers to receiving time and transmitting time of the communication data packet received last time. The communication data packet received last time refers to a communication data packet which is most close to the currently received communication data packet and is received before the currently received communication data packet is received.

Therefore, the process of determining a first queue delay, by the network side, based on transceiving time of a currently received communication data packet and transceiving time of a communication data packet received last time may include: determining a first difference between receiving time of the currently received communication data packet and receiving time of the communication data packet received last time, as a receiving time interval; determining a second difference between transmitting time of the currently received communication data packet and transmitting time of the communication data packet received last time, as a transmitting time interval; and determining a third difference between the receiving time interval and the transmitting time interval, as the first queue delay.

For example, if the receiving time of the currently received communication data packet is 10:20:31, the transmitting time of the currently received communication data packet is 10:20:11, the receiving time of the communication data packet received last time is 10:20:18 and the transmitting time of the communication data packet received last time is 10:20:01, the network side determines that a first difference between the receiving time of the currently received communication data packet, i.e., 10:20:31, and the receiving time of the communication data packet received last time, i.e., 10:20:18, is 13 seconds, thereby determining the receiving time interval as 13 seconds; determines that a second difference between the transmitting time of the currently received communication data packet, i.e., 10:20:11, and the transmitting time of the communication data packet received last time, i.e., 10:20:01, is 10 seconds, thereby determining the transmitting time interval as 10 seconds; and determines a third difference between the receiving time interval 13 seconds and the transmitting time interval 10 seconds is 3 seconds, thereby determining the first queue delay as 3 seconds.

It should be noted that, the user terminal is to transmit a communication data packet to the network side, a timestamp corresponding to the transmitting time of the communication data packet is carried in the communication data packet based on the transmitting time. Therefore, in order to obtain the transmitting time of the currently received communication data packet, the network side may acquire the timestamp carried in the currently received communication data packet, and convert the timestamp to obtain the transmitting time of the currently received communication data packet. Similarly, in order to obtain the transmitting time of the communication data packet received last time, the network side may acquire a timestamp carried in the communication data packet received last time, and convert the timestamp to obtain the transmitting time of the communication data packet received last time.

It should be noted that, a difference between the receiving time interval and the transmitting time interval is generally used to indicate delay jitter between the currently received communication data packet and the communication data packet received last time. The delay jitter is a difference between a delay time period of the currently received communication data packet and a delay time period of the communication data packet received last time, where the delay time period of the currently received communication data packet is a difference between the transmitting time and the receiving time of the currently received communication data packet, and the delay time period of the communication data packet received last time is a difference between the transmitting time and the receiving time of the communication data packet received last time.

During a process that the currently received communication data packet and the communication data packet received last time are transmitted to the network side, the generated delay time period for the currently received communication data packet and the generated delay time period for the communication data packet received last time are different, and the delay time period includes a transmission delay, a propagation delay and a queue delay. The propagation delay is a constant during a communication process of multiple user terminals, that is, a propagation delay of the currently received communication data packet is equal to a propagation delay of the communication data packet received last time. In addition, a difference between a transmission delay of the currently received communication data packet and a transmission delay of the communication data packet received last time is small, which may be ignored. Therefore, the difference between a queue delay of the currently received communication data packet and a queue delay of the communication data packet received last time may be used to indicate the delay jitter between the currently received communication data packet and the communication data packet received last time, thereby determining the delay jitter between the currently received communication data packet and the communication data packet received last time as the first queue delay.

Further, when multiple user terminals are to communicate, the multiple user terminals transmit respective communication capability information to the network side. For each of the multiple user terminals, when the network side receives the communication capability information transmitted by the user terminal, the network side may set a first quality of service parameter for the user terminal based on the communication capability information transmitted by the user terminal and transmit the first quality of service parameter to the user terminal; and when the user terminal receives the first quality of service parameter transmitted by the network side, the user terminal may transmit a communication data packet to the network side based on the first quality of service parameter.

When the multiple user terminals are to communicate, the multiple user terminals may communicate through a communication group. Methods for communicating by the multiple user terminals though the communication group may be referred to related technologies, which are not clarified in detail in the embodiment of the present disclosure.

It should be noted that, the multiple user terminals refer to terminals corresponding to multiple users who communicate with each other currently, and the multiple user terminals may be computers, mobile phones and tablet computers and so on. Types of networks of the multiple user terminals may include a wired network, a wireless network and 2/3/4G networks and so on. The communication capability information transmitted from the multiple user terminals to the network side may include a packet loss rate, a delay time period, network jitter and a type of a connected network and so on, which is not limited in the embodiment of the present disclosure.

In addition, the first quality of service parameter may include an audio core code rate, the number of channels, an audio packet length and a Forward Error Correction (FEC) parameter and so on, which is not limited in the embodiment of the present disclosure.

Further, since the communication data packet is influenced by various noises during a transmission process, for example a Gauss noise and a low frequency noise, the timestamp carried in the communication data packet received by the network side contains various noises and the transmitting time of the communication data packet determined based on the timestamp may contain a certain error, thereby resulting in that the first queue delay contains an error. Therefore, when receiving the communication data packet, the network side needs to perform noise processing on the received communication data packet and acquire the timestamp carried in the communication data packet from the processed communication data packet, thereby determining the transmitting time of the communication data packet.

In the embodiment of the present disclosure, the network side may use a digital filter such as a Kalman filter to perform noise processing on the received communication data packet. Practically, in an actual application, the network side may use a Wiener filter or a Chebyshev filter to perform noise processing on the received communication data packet. The detailed process of performing noise processing on the received communication data packet may be referred to related art, which is not clarified in detail in the embodiment of the present disclosure.

In step 302, a network status of the user terminal is determined based on the first queue delay and a stored second queue delay, where the second queue delay is queuing time of the communication data packet received last time in the buffer queue of the router.

The queue delay is queuing time of the communication data packet in the buffer queue of the router, and when the network status changes, the queuing time of the communication data packet in the buffer queue of the router changes, and thus the queue delay changes accordingly. Therefore, in the embodiment of present disclosure, the network side may determine the network status of the user terminal based on the first queue delay and the stored second queue delay. The process of determining the network status of the user terminal by the network side based on the first queue delay and the stored second queue delay may include: in a case that the first queue delay is equal to the second queue delay, determining that the network status of the user terminal is a normal status; in a case that the first queue delay is not equal to the second queue delay: determining a fourth difference between the first queue delay and the second queue delay to obtain a delay duration, and determining the network status of the user terminal based on the first queue delay, the second queue delay and the delay duration.

The process of determining the network status of the user terminal by the network side based on the first queue delay, the second queue delay and the delay duration may include: determining whether the delay duration is greater than or equal to a first threshold in a case that the first queue delay is greater than the second queue delay; determining that the network status of the user terminal is an overload status in a case that the delay duration is greater than or equal to the first threshold, and determining that the network status of the user terminal is a normal status in a case that the delay duration is less than the first threshold; determining whether the delay duration is greater than or equal to a second threshold in a case that the first queue delay is less than the second queue delay; determining that the network status of the user terminal is an idle status in a case that the delay duration is greater than or equal to the second threshold, and determining that the network status of the user terminal is a normal status in a case that the delay duration is less than the second threshold.

For example, if the first queue delay is 3 s, the second queue delay is 2 s and the first threshold is 1 s, the network side determines that a fourth difference between the first queue delay 3 s and the second queue delay 2 s is 1 s, thereby determining the delay duration as 1 s. Since the first queue delay 3 s is greater than the second queue delay 2 s and the delay duration 1 s is equal to the first threshold 1 s, the network side determines that the network status of the user terminal is an overload status.

It should be noted that, the first threshold and the second threshold may be preset, and which of the first threshold and the second threshold being greater is not limited in the embodiment of the present disclosure. For example, both the first threshold and the second threshold may be 1 s, 2 s and 3 s and so on, which is not limited in the embodiment of the present disclosure either.

Further, the network side may control the traffic in a real time manner with the method according to the embodiment of the present disclosure, may also control the traffic periodically with the method according to the embodiment of the present disclosure. In addition, before determining the network status of the user terminal based on the first queue delay and the stored second queue delay, the network side may determine the second queue delay. The second queue delay may be obtained from the stored queue delay or obtained by calculating in a real time manner. That is, when controlling the traffic in a real time manner, the network side may calculate a queue delay of a communication data packet when receiving the communication data packet and store the queue delay of the communication data packet. Then, the network side may acquire the second queue delay from the stored queue delay. When controlling the traffic periodically, the network side may calculate the second queue delay in a real time manner in each period and store the calculated second queue delay. The method for calculating the second queue delay is similar to that of the first queue delay described above, which is not clarified in detail in the embodiment of the present disclosure.

In step 303, a network bandwidth of the user terminal is predicted based on the network status of the user terminal and the reception data volume, where the reception data volume is a data volume of the currently received communication data packet or a data volume transmitted by the user terminal which is received in a specified time interval.

In order to prevent network congestion from occurring during a communication process of the user terminal and further improve a communication quality of the user terminal, the network side may predict a network bandwidth of the user terminal based on the network status of the user terminal and the reception data volume. The process of predicting the network bandwidth of the user terminal by the network side based on the network status of the user terminal and the received data volume transmitted by the user terminal may include cases (1) and (2) in the following.

In case (1), in a case that the reception data volume is a data volume transmitted by the user terminal which is received in a specified time interval, the data volume transmitted by the user terminal which is received in the specified time interval is divided by a length of the specified time interval, to obtain a reference bandwidth. The reference bandwidth is multiplied by a first bandwidth coefficient to obtain the network bandwidth of the user terminal, in a case that the network status of the user terminal is an overload status. The reference bandwidth is multiplied by a second bandwidth coefficient to obtain the network bandwidth of the user terminal, in a case that the network status of the user terminal is an idle status. The reference bandwidth is determined as the network bandwidth of the user terminal, in a case that the network status of the user terminal is a normal status.

For example, if the network status of the user terminal is an overload status, the first bandwidth coefficient is 0.9, the specified time interval is 10 s and a data volume transmitted by the user terminal which is received by the network side in 10 s is 1000 kb, the data volume 1000 kb transmitted by the user terminal which is received by the network side in 10 s is divided by 10 s, to obtain a reference bandwidth 100 kbps. The network status of the user terminal is the overload status, therefore the network side multiplies the reference bandwidth 100 kbps by the first bandwidth coefficient 0.9, thereby determining the network bandwidth of the user as 90 kbps.

It should be noted that, the first bandwidth coefficient may be a preset fixed value and the first bandwidth coefficient is greater than 0 and less than 1, for example the first bandwidth coefficient is 0.9. Practically, the first bandwidth coefficient may be a value randomly selected from a preset interval of the first bandwidth coefficient. For example, the first bandwidth coefficient may be a value randomly selected from a preset interval [0.8, 0.95] of the first bandwidth coefficient, for example 0.8, 0.82 and 0.91, which is not limited in the embodiment of the present disclosure. Similarly, the second bandwidth coefficient may be a preset fixed value and is greater than 1, for example, the second bandwidth coefficient is 1.1. Practically, the second bandwidth coefficient may be a value randomly selected from a preset interval of the second bandwidth coefficient. For example, the second bandwidth coefficient may be a value randomly selected from a preset interval [1.005, 1.3] of the second bandwidth coefficient, for example 1.005, 1.2 and 1.3, which is not limited in the embodiment of the present disclosure either.

In case (2), in a case that the reception data volume is a data volume of the currently received communication data packet, a value of the data volume is determined as a reference bandwidth. The reference bandwidth is multiplied by a first bandwidth coefficient to obtain the network bandwidth of the user terminal, in a case that the network status of the user terminal is an overload status. The reference bandwidth is multiplied by a second bandwidth coefficient to obtain the network bandwidth of the user terminal, in a case that the network status of the user terminal is an idle status. And the reference bandwidth is determined as the network bandwidth of the user terminal, in a case that the network status of the user terminal is a normal status.

For example, if the network status of the user terminal is an overload status, the first bandwidth coefficient is 0.9, and the data volume of the currently received communication data packet is 100 kb, the network side determines a value of the data volume as a value of the reference bandwidth, thereby determining the reference bandwidth as 100 kbps. The network status of the user terminal is an overload status, therefore the network side multiplies the reference bandwidth 100 kbps by the first bandwidth coefficient 0.9, thereby determining the network bandwidth of the user as 90 kbps.

Further, before predicting the network bandwidth of the user terminal based on the network status of the user terminal and the reception data volume, the network side may not only count data volumes of all communication data packets transmitted by the user terminal in the specified time interval and add the data volumes of all the communication data packets to obtain a data volume transmitted by the user terminal in the specified time interval; but also count a data volume of the currently received communication data packet which is transmitted by the user terminal, and determine the counted data volume of the current communication data packet as a reception data volume.

In step 304, a first quality of service parameter is adjusted based on the network status and the network bandwidth of the user terminal, to obtain a second quality of service parameter, where the first quality of service parameter is a quality of service parameter set for the user terminal currently.

In order to obtain a good communication quality of multiple user terminals and avoid network congestion during a communication process of the user terminal in a case of a limited network bandwidth, the network side may adjust the first quality of service parameter based on the network status and the network bandwidth of the user terminal, to obtain the second quality of service parameter. The process of adjusting the first quality of service parameter by the network side based on the network status and the network bandwidth of the user terminal, to obtain the second quality of service parameter may include three cases as described in the following.

In a first case, when the network status of the user terminal is an overload status, the network side determines that the data volume of the communication data packets transmitted by the user terminal is much greater than the network bandwidth of the user terminal. In order to avoid network congestion during a communication process of the user terminal, the network side may reduce the first quality of service parameter to obtain a second quality of service parameter.

The process of reducing the first quality of service parameter by the network side based on the network status and the network bandwidth of the user terminal, to obtain a second quality of service parameter may include: when the network status of the user terminal is an overload status, acquiring, by the network side, a respective quality of service parameter according to a correspondence between the stored network bandwidths and quality of service parameters, and determining, by the network side, the acquired quality of service parameter as the second quality of service parameter, where the second quality of service parameter is less than the first quality of service parameter.

For example, the correspondence between the network bandwidths and the quality of service parameters is shown as the following table 1. The first quality of service parameter is a parameter 3; when the network bandwidth is 30 kbps, the network side acquires, based on the network bandwidth 30 kbps, a parameter 1 as a respective quality of service parameter according to the correspondence between the network bandwidths and the quality of service parameters shown in the table 1, and determines the parameter 1 as the second quality of service parameter.

TABLE 1

| network bandwidth | quality of service parameter |
|---|---|
| 30 kbps | parameter 1 |
| 60 kbps | parameter 2 |
| 90 kbps | parameter 3 |
| 120 kbps | parameter 4 |
| ... | ... |

Further, in addition to reducing the first quality of service parameter according to the above method, the network side may reduce the first quality of service parameter according to other methods. For example, the network side acquires, according to the correspondence between the network bandwidths and the quality of service parameters, a quality of service parameter which is less than the first quality of service parameter and is most close to the first quality of service parameter in size, and determines the acquired quality of service parameter as the second quality of service parameter. For example, it is described in step 301 that the first quality of service parameter may include an audio core code rate, the number of channels, an audio packet length and an FEC parameter and so on, therefore the network side may reduce the audio core code rate included in the first quality of service parameter by a first code rate threshold, reduce the number of channels included in the first quality of service parameter by a first channel threshold, reduce the audio packet length included in the first quality of service parameter by a first length threshold, and reduce an anti-packet-loss rate in the FEC parameter included in the first quality of service parameter by a first packet loss rate threshold and so on. That is, the network side reduces each parameter included in the first quality of service parameter by a respective fixed step.

It should be noted that, the first code rate threshold, the first channel threshold, the first length threshold and the first packet loss rate threshold may be preset fixed values, and relationships in size between the first code rate threshold, the first channel threshold, the first length threshold and the first packet loss rate threshold are not limited in the embodiment of the present disclosure.

In a second case, when the network status of the user terminal is an idle status, the network side determines that the data volume of the communication data packets transmitted by the user terminal is much less than a network bandwidth of a network connected to the user terminal. In order to sufficiently utilize the network bandwidth of the user terminal and improve a communication quality of the user terminal, the network side may increase the first quality of service parameter to obtain a second quality of service parameter.

The process of increasing the first quality of service parameter by the network side based on the network status and the network bandwidth of the user terminal, to obtain the second quality of service parameter may include: when the network status of the user terminal is an idle status, acquiring, by the network side, based on the first quality of service parameter and according to the correspondence between the stored network bandwidths and the quality of service parameters, a quality of service parameter which is greater than the first quality of service parameter and most close to the first quality of service parameter in size, and determining, by the network side, the acquired quality of service parameter as the second quality of service parameter.

For example, the correspondence between the network bandwidths and the quality of service parameters is shown in the table 1 described above; when the network status of the user terminal is an idle status and the first quality of service parameter is the parameter 3, the network side acquires, according to the correspondence between the network bandwidths and the quality of service parameters shown in the table 1, a quality of service parameter which is greater than the parameter 3 and is most close to the parameter 3 in size, i.e., a parameter 4, and determines the parameter 4 as the second quality of service parameter.

Further, in addition to increasing the first quality of service parameter according to the method described above, the network side may increase the first quality of service parameter according to other methods. For example, the network side increases the audio core code rate included in the first quality of service parameter by a second code rate threshold, increases the number of channels included in the first quality of service parameter by a second channel threshold, increases the audio packet length included in the first quality of service parameter by a second length threshold, and increases the anti-packet-loss rate in the FEC parameter included in the first quality of service parameter by a second packet loss rate threshold and so on. That is, the network side increases each parameter included in the first quality of service parameter by a respective fixed step.

It should be noted that, the second code rate threshold, the second channel threshold, the second length threshold and the second packet loss rate threshold may be preset fixed values, and relationships in size between the second code rate threshold, the second channel threshold, the second length threshold and the second packet loss rate threshold are not limited in the embodiment of the present disclosure.

In a third case, when the network status of the user terminal is a normal status, the network side determines that a difference between the data volume of the communication data packets transmitted by the user terminal and the network bandwidth of the user terminal is small, and determines that the user terminal can sufficiently utilize the network bandwidth of the user terminal and no network congestion occurs. Therefore, the network side may directly determine the first quality of service parameter as the second quality of service parameter.

Further, after setting the first quality of service parameter for each user terminal, the network side may further store the first quality of service parameter set for each user terminal. Therefore, after the network side determines the second quality of service parameter, the network side may update the stored first quality of service parameter so as to facilitate controlling the traffic next time. That is, the network side may replace the stored first quality of service parameter with the second quality of service parameter.

In step 305, the second quality of service parameter is transmitted to the user terminal, such that the user terminal transmits the communication data packet based on the second quality of service parameter.

The network side transmits the second quality of service parameter to the user terminal, to control the traffic during a communication process of the user terminal. When the user terminal receives the second quality of service parameter, the user terminal may transmit the communication data packet based on the second quality of service parameter.

Figure 4:
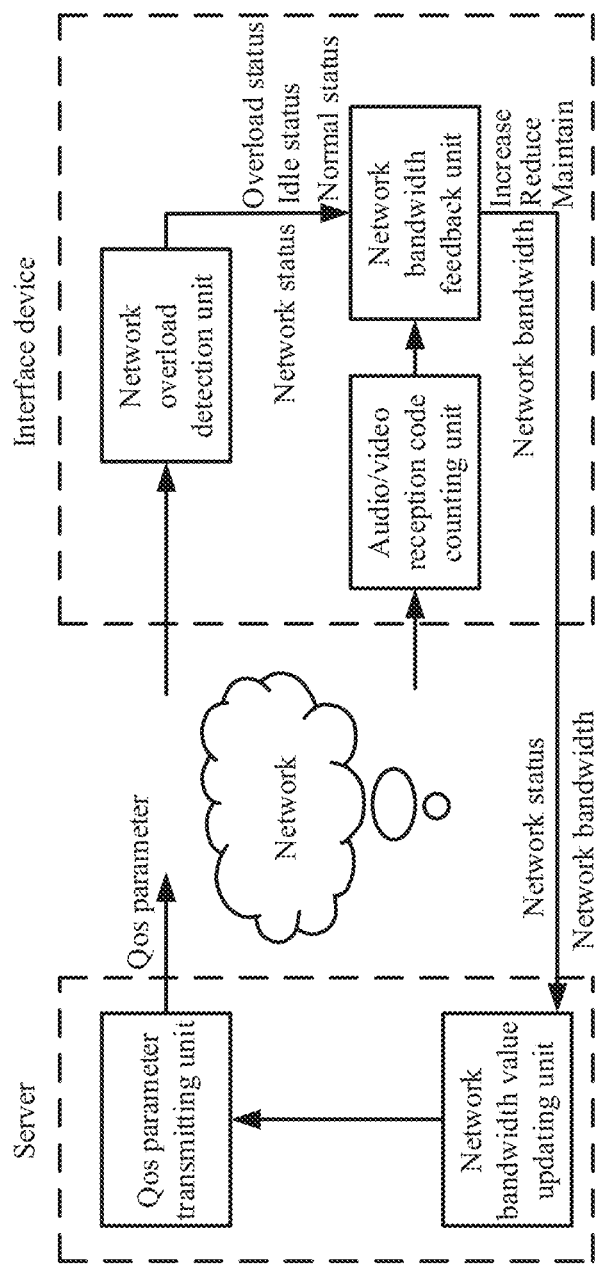
FIG. 4 is a schematic structural diagram of a traffic control apparatus according to an embodiment of the present disclosure.

Further, in order to clarify a performing process of the network side in detail, the network side may be divided. As shown in FIG. 4, in a case that multiple user terminals perform group communication, the network side may be divided into a server and an interface device.

The interface device is also referred to as an interface processing device and is configured to process transmission information at a middle node in a communication link. The interface device may include a network overload detection unit, a network bandwidth feedback unit and an audio/video reception code counting unit. The network overload detection unit is configured to receive communication capability information and communication data packets transmitted by the multiple user terminals, and the network overload detection unit may determine a first queue delay based on transceiving time of a currently received communication data packet and transceiving time of a communication data packet received last time, and determine a network status of the user terminal based on the first queue delay and a stored second queue delay. The audio/video reception code counting unit is configured to count a data volume of communication data packets transmitted by the user terminal which is received in a specified time interval and transmit the data volume to the network bandwidth feedback unit. The network bandwidth feedback unit may predict a network bandwidth of the user terminal based on the network status of the user terminal and the data volume transmitted by the user terminal which is received in the specified time interval, and may transmit the network status and the network bandwidth of the user terminal to the server.

The server includes a network bandwidth value updating unit and a QoS parameter transmitting unit. The network bandwidth value updating unit is configured to receive the network status and the network bandwidth of the user terminal which is transmitted by the network bandwidth feedback unit, and adjust a first quality of service parameter based on the network status and the network bandwidth of the user terminal, to obtain a second quality of service parameter. The network bandwidth value updating unit replaces the stored first quality of service parameter with the second quality of service parameter, and transmits the second quality of service parameter to the QoS parameter transmitting unit. When receiving the second quality of service parameter, the QoS parameter transmitting unit transmits the second quality of service parameter to the user terminal, such that the user terminal transmits a communication data packet based on the received second quality of service parameter.

It should be noted that, the embodiment of the present disclosure is illustrated by dividing the network side as the server and the interface device in FIG. 4, for example. FIG. 4 does not limit composition of the network side in the embodiment of the present disclosure.

In the embodiment of the present disclosure, the network side determines the first queue delay based on transceiving time of the currently received communication data packet and transceiving time of the communication data packet received last time; the network side adjusts the first quality of service parameter based on the first queue delay, the stored second queue delay and the reception data volume, to obtain the second quality of service parameter, and transmits the second quality of service parameter to the user terminal, such that the user terminal transmits the communication data packet based on the second quality of service parameter. Therefore, the network side can adaptively adjust in response to real-time change of the network, adjust different quality of service parameters based on difference configurations of the multiple user terminals, and control the traffics of the multiple user terminals finely, thereby avoiding network congestion and improving a communication quality in a case of multi-user communication in a case that the network bandwidth is limited.

Figure 5:
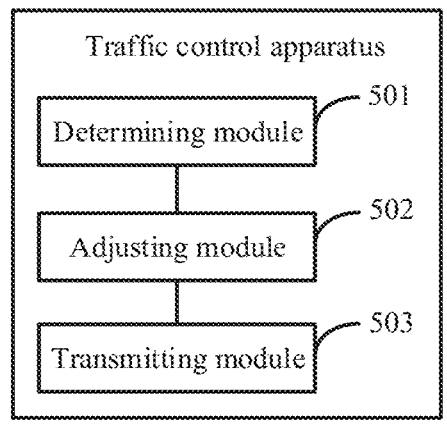
FIG. 5 is a schematic structural diagram of another traffic control apparatus according to an embodiment of the present disclosure.

FIG. 5 shows a traffic control apparatus applied to a device on a network side according to an embodiment of the present disclosure. As shown in FIG. 5, the apparatus includes a determining module 501, an adjusting module 502 and a transmitting module 503.

The determining module 501 is configured to determine a first queue delay based on transceiving time of a communication data packet currently received by the device on the network side and transceiving time of a communication data packet received by the device on the network side from the user terminal last time, where the first queue delay is queuing time of the currently received communication data packet in a buffer queue of a router.

The adjusting module 502 is configured to adjust a first quality of service parameter based on the first queue delay, a second queue delay stored from the user terminal and a reception data volume of the device on the network side, to obtain a second quality of service parameter, where the first quality of service parameter is a quality of service parameter initially set for the user terminal by the device on the network side, the second queue delay is queuing time of the communication data packet received last time in the buffer queue of the router, and the reception data volume is a data volume of the currently received communication data packet or a data volume received by the device on the network side from the user terminal in a specified time interval.

The transmitting module 503 is configured to transmit the second quality of service parameter to the user terminal, such that the user terminal transmits subsequent communication data packets based on the second quality of service parameter.

Figure 6:
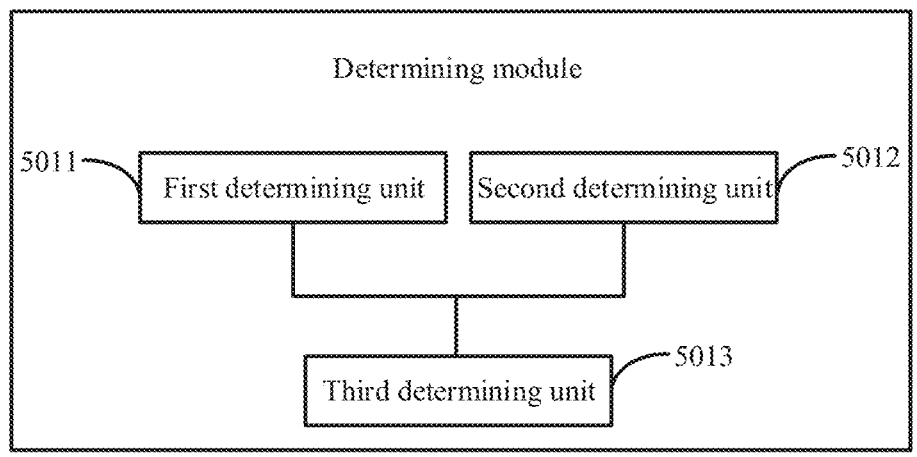
FIG. 6 is a schematic structural diagram of a determining module according to an embodiment of the present disclosure.

Optionally, as shown in FIG. 6, the determining module 501 includes a first determining unit 5011, a second determining unit 5012 and a third determining unit 5013.

The first determining unit 5011 is configured to determine a first difference between receiving time of the currently received communication data packet and receiving time of the communication data packet received last time, as a receiving time interval.

The second determining unit 5012 is configured to determine a second difference between transmitting time of the currently received communication data packet and transmitting time of the communication data packet received last time, as a transmitting time interval.

The third determining unit 5013 is configured to determine a third difference between the receiving time interval and the transmitting time interval, as the first queue delay.

Figure 7:
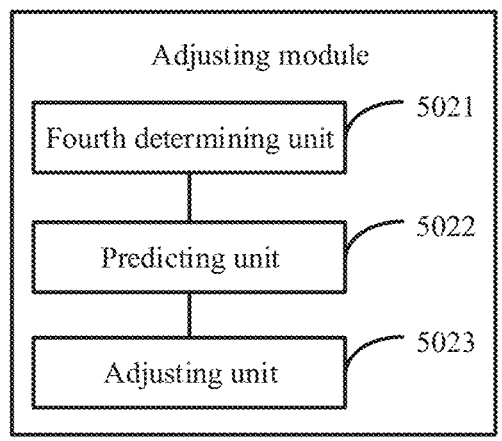
FIG. 7 is a schematic structural diagram of an adjusting module according to an embodiment of the present disclosure.

Optionally, as shown in FIG. 7, the adjusting module 502 includes a fourth determining unit 5021, a predicting unit 5022 and an adjusting unit 5023.

The fourth determining unit 5021 is configured to determine a network status of the user terminal based on the first queue delay and the stored second queue delay.

The predicting unit 5022 is configured to predict a network bandwidth of the user terminal based on the network status of the user terminal and the reception data volume.

The adjusting unit 5023 is configured to adjust a first quality of service parameter based on the network status and the network bandwidth of the user terminal, to obtain the second quality of service parameter.

Figure 8:
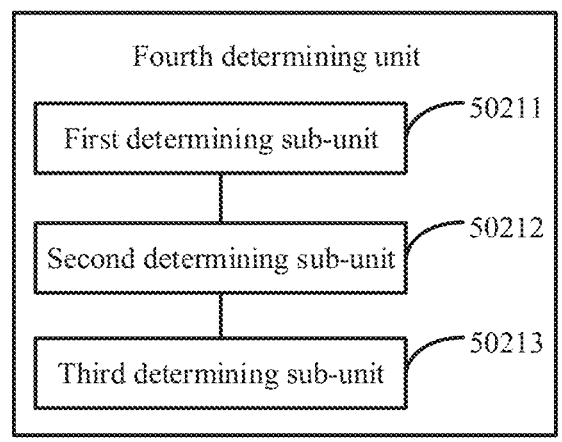
FIG. 8 is a schematic structural diagram of a fourth determining unit according to an embodiment of the present disclosure.

Optionally, as shown in FIG. 8, the fourth determining unit 5021 includes a first determining sub-unit 50211, a second determining sub-unit 50212 and a third determining sub-unit 50213.

The first determining sub-unit 50211 is configured to determine that the network status of the user terminal is a normal status in a case that the first queue delay is equal to the second queue delay.

The second determining sub-unit 50212 is configured to determine a fourth difference between the first queue delay and the second queue delay to obtain a delay duration, in a case that the first queue delay is not equal to the second queue delay.

The third determining sub-unit 50213 is configured to determine the network status of the user terminal based on the first queue delay, the second queue delay and the delay duration.

Optionally, the third determining sub-unit 50213 is configured to:

determine whether the delay duration is greater than or equal to a first threshold, in a case that the first queue delay is greater than the second queue delay;

determine that the network status of the user terminal is an overload status in a case that the delay duration is greater than or equal to the first threshold; and determine that the network status of the user terminal is a normal status in a case that the delay duration is less than the first threshold;

determine whether the delay duration is greater than or equal to a second threshold in a case that the first queue delay is less than the second queue delay; and determine that the network status of the user terminal is an idle status in a case that the delay duration is greater than or equal to the second threshold; and determine that the network status of the user terminal is a normal status in a case that the delay duration is less than the second threshold.

Figure 9:
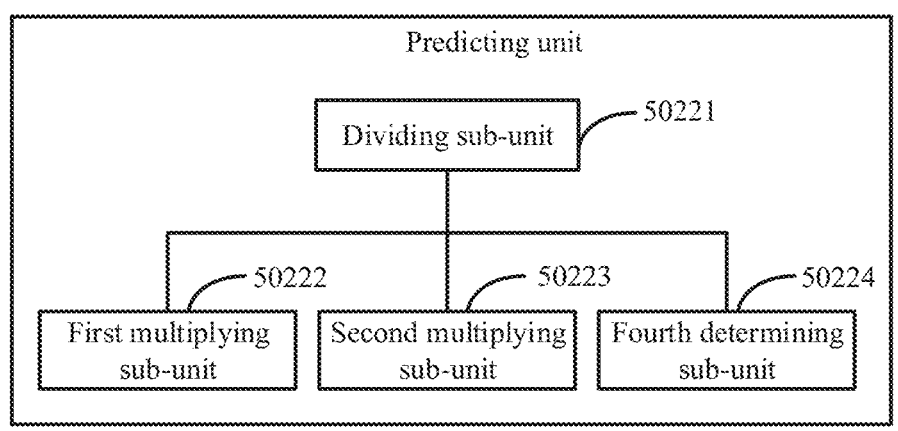
FIG. 9 is a schematic structural diagram of a predicting unit according to an embodiment of the present disclosure.

Optionally, as shown in FIG. 9, the predicting unit 5022 includes a dividing sub-unit 50221, a first multiplying sub-unit 50222, a second multiplying sub-unit 50223 and a fourth determining sub-unit 50224.

The dividing sub-unit 50221 is configured to divide a data volume transmitted by the user terminal which is received in a specified time interval by a length of the specified time interval to obtain a reference bandwidth, in a case that the reception data volume is the data volume transmitted by the user terminal which is received in the specified time interval.

The first multiplying sub-unit 50222 is configured to multiply the reference bandwidth by a first bandwidth coefficient to obtain the network bandwidth of the user terminal, in a case that the network status of the user terminal is an overload status.

The second multiplying sub-unit 50223 is configured to multiply the reference bandwidth by a second bandwidth coefficient to obtain the network bandwidth of the user terminal, in a case that the network status of the user terminal is an idle status.

The fourth determining sub-unit 50224 is configured to determine the reference bandwidth as the network bandwidth of the user terminal, in a case that the network status of the user terminal is a normal status.

Optionally, the user terminal may be one of multiple user terminals coupled to the device on the network side, and the multiple user terminals perform network communication with the device on the network side simultaneously.

In summary, in the embodiment of the present disclosure, the network side determines the first queue delay based on the transceiving time of the currently received communication data packet and the transceiving time of the communication data packet received last time; the network side adjusts the first quality of service parameter based on the first queue delay, the stored second queue delay and the reception data volume, to obtain the second quality of service parameter, and transmits the second quality of service parameter to the user terminal, such that the user terminal transmits the communication data packet based on the second quality of service parameter. Therefore, the network side can adaptively adjust in response to real-time change of the network, thereby avoiding network congestion and improving a communication quality of multi-user communication in a case that the network bandwidth is limited.

It should be noted that, in a case of triggering traffic control, the traffic control apparatus according to the above embodiment is illustrated by dividing of respective functional modules; in an actual application, the above functions may be allocated to different functional modules to achieve as needed, i.e., the apparatus is divided into different functional modules to achieve all or a part of functions described above. In addition, the apparatus for triggering traffic control according to the above embodiment and the method for triggering traffic control described above belong to the same concept, and specific implementation processes for the apparatus may be referred to the method embodiment, which is not described in detail here.

Figure 10:
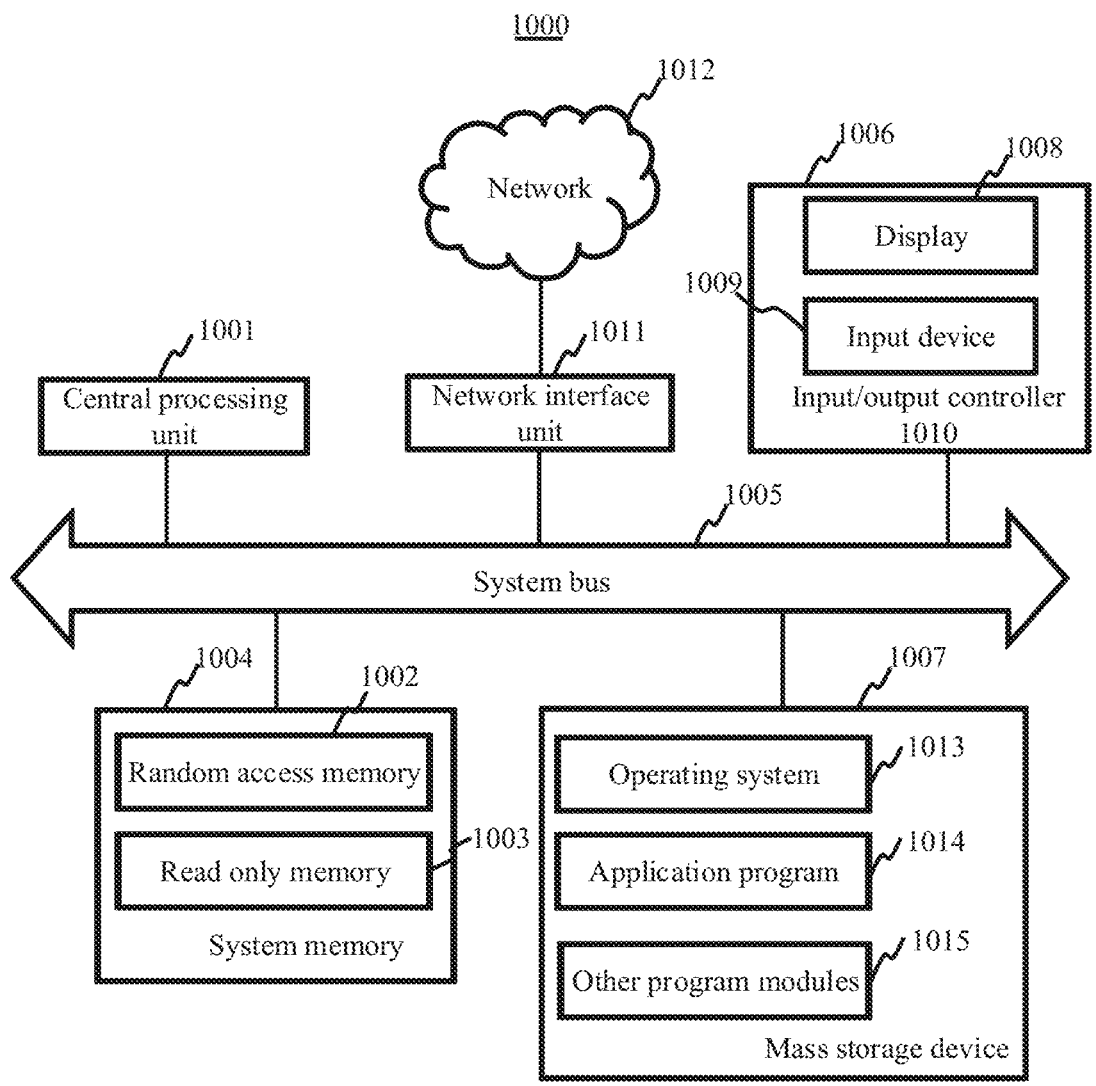
FIG. 10 is a schematic structural diagram of another traffic control apparatus according to an embodiment of the present disclosure.

Reference is made to FIG. 10, which shows a schematic structural diagram of a server 1000 according to an embodiment of the present disclosure. The server 1000 includes: a Central Processing Unit (CPU) 1001, a system memory 1004 including a Random Access Memory (RAM) 1002 and a Read Only Memory (ROM) 1003, and a system bus 1005 connecting the system memory 1004 and the central processing unit 1001. The server 1000 further includes a basic input/output system (I/O system) 1006 configured to transmit information between respective components in a computer and a mass storage device 1007 configured to store an operating system 1013, an application program 1014 and other program modules 1015.

The basic input/output system 1006 includes: a display 1008 configured to display information and an input device 1009 configured to input information by a user, such as a mouse or a keyboard. The display 1008 and the input device 1009 are connected to the central processing unit 1001 via an input and output controller 1010 connected to the system bus 1005. The basic input/output system 1006 may further include the input and output controller 1010 configured to receive and process input from multiple input devices such as a keyboard, a mouse or an electronic stylus. Similarly, the input and output controller 1010 provides output to a display screen, a printer or other types of output devices.

The mass storage device 1007 is connected to the central processing unit 1001 via a mass storage controller (not shown) connected to the system bus 1005. The mass storage device 1007 and an associated computer readable medium provide nonvolatile storage for the server 1000. That is, the mass storage device 1007 may include a computer readable medium (not shown) such as a hard disk or a CD-ROM driver.

Without loss of generality, the computer readable medium may include a computer storage medium and a communication medium. The computer storage medium includes a volatile medium, a nonvolatile medium, a movable medium and a non-movable medium which are implemented by any method or technology for storing information such as computer readable instructions, data structures, program modules and other data. The computer storage medium includes: RAM, ROM, EPROM, EEPROM, a flash memory or other solid state devices, CD-ROM, DVD or other optical storage devices, a magnetic tape cartridge, a magnetic tape, a magnetic disk storage device or other magnetic storage devices. Practically, those skilled in the art should know that the computer storage medium is not limited to the devices described above. The system memory 1004 and the mass storage device 1007 described above may be called as a memory collectively.

According to various embodiments of the present disclosure, the server 1000 may operate by connecting to a remote computer over a network such as the Internet. That is, the server 1000 may be connected to a network 1012 via a network interface unit 1011 connected to the system bus 1005, or the server 1000 may be connected to other types of networks or remote computer systems (not shown) using the network interface unit 1011.

The memory further includes one or more programs stored therein, and the one or more programs include instructions for performing the traffic control method according to the embodiment of the present disclosure. The method include:

determining a first queue delay based on transceiving time of a communication data packet currently received by the server from a user terminal and transceiving time of a communication data packet received by the server from the user terminal last time, where the first queue delay is queuing time of the currently received communication data packet in a buffer queue of a router;

adjusting a first quality of service parameter based on the first queue delay, a second queue delay stored by the server and a reception data volume of the server, to obtain a second quality of service parameter, where the first quality of service parameter is a quality of service parameter initially set for the user terminal by the server, the second queue delay is queuing time of the communication data packet received last time in the buffer queue of the router, and the reception data volume is a data volume of the currently received communication data packet or a data volume received by the server from the user terminal in a specified time interval; and transmitting the second quality of service parameter to the user terminal, such that the user terminal transmits subsequent communication data packets based on the second quality of service parameter.

Optionally, the determining a first queue delay based on transceiving time of the currently received communication data packet and transceiving time of the communication data packet received last time may include:

determining a first difference between receiving time of the currently received communication data packet and receiving time of the communication data packet received last time, as a receiving time interval;

determining a second difference between transmitting time of the currently received communication data packet and transmitting time of the communication data packet received last time, as a transmitting time interval; and determining a third difference between the receiving time interval and the transmitting time interval, as the first queue delay.

Optionally, the adjusting a first quality of service parameter based on the first queue delay, the stored second queue delay and the reception data volume to obtain a second quality of service parameter may include:

determining a network status of the user terminal based on the first queue delay and the stored second queue delay;

predicting a network bandwidth of the user terminal based on the network status of the user terminal and the reception data volume; and adjusting the first quality of service parameter based on the network status and the network bandwidth of the user terminal, to obtain the second quality of service parameter.

Optionally, the determining a network status of the user terminal based on the first queue delay and the stored second queue delay may include:

in a case that the first queue delay is equal to the second queue delay, determining that the network status of the user terminal is a normal status; and in a case that the first queue delay is not equal to the second queue delay:

determining a fourth difference between the first queue delay and the second queue delay to obtain a delay duration; and determining the network status of the user terminal based on the first queue delay, the second queue delay and the delay duration.

Optionally, the determining the network status of the user terminal based on the first queue delay, the second queue delay and the delay duration may include:

determining whether the delay duration is greater than or equal to a first threshold in a case that the first queue delay is greater than the second queue delay;

determining that the network status of the user terminal is an overload status in a case that the delay duration is greater than or equal to a first threshold; and determining that the network status of the user terminal is a normal status in a case that the delay duration is less than the first threshold;

determining whether the delay duration is greater than or equal to a second threshold in a case that the first queue delay is less than the second queue delay; and determining that the network status of the user terminal is an idle status in a case that the delay duration is greater than or equal to the second threshold; and determining that the network status of the user terminal is a normal status in a case that the delay duration is less than the second threshold.

Optionally, the predicting a network bandwidth of the user terminal based on the network status of the user terminal and the reception data volume may include:

dividing a data volume transmitted by the user terminal which is received in a specified time interval by a length of the specified time interval to obtain a reference bandwidth, in a case that the reception data volume is the data volume transmitted by the user terminal which is received in the specified time interval;

multiplying the reference bandwidth by a first bandwidth coefficient to obtain the network bandwidth of the user terminal, in a case that the network status of the user terminal is an overload status;

multiplying the reference bandwidth by a second bandwidth coefficient to obtain the network bandwidth of the user terminal, in a case that the network status of the user terminal is an idle status; and determining the reference bandwidth as the network bandwidth of the user terminal, in a case that the network status of the user terminal is a normal status.

According to the embodiment of the present disclosure, the network side determines the first queue delay based on transceiving time of the currently received communication data packet and transceiving time of the communication data packet received last time; the network side adjusts the first quality of service parameter based on the first queue delay, the stored second queue delay and the reception data volume, to obtain the second quality of service parameter, and transmits the second quality of service parameter to the user terminal, such that the user terminal transmits the communication data packet based on the second quality of service parameter. Therefore, the network side can adaptively adjust in response to real-time change of the network, thereby avoiding network congestion and improving a communication quality of multi-user communication in a case that the network bandwidth is limited.

Figure 11:
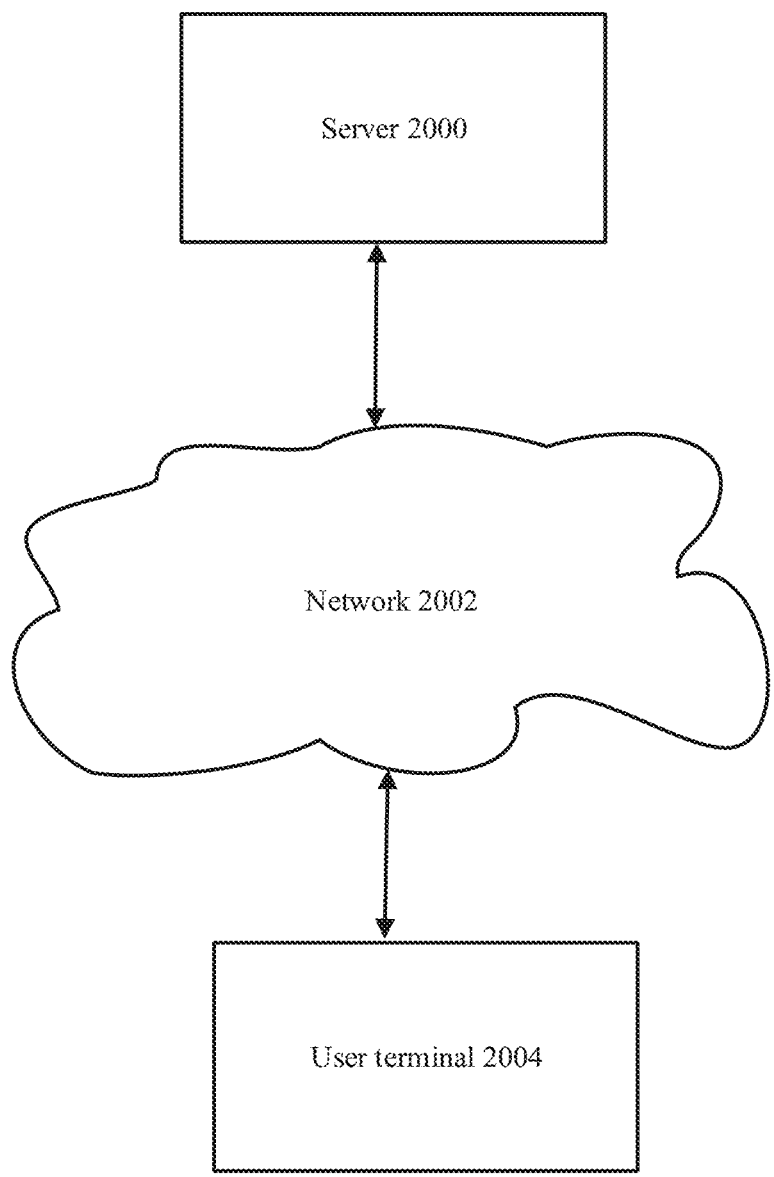
FIG. 11 is a schematic diagram of an application environment for traffic control according to an embodiment of the present disclosure.

FIG. 11 shows an application environment for traffic control according to an embodiment of the present disclosure. As shown in FIG. 11, a server 2000 communicates with a user terminal 2004 over a network 2002.

According to an embodiment, the server is configured to:

initially set a first quality of service parameter for the user terminal;

determine a first queue delay of a first communication data packet received from the user terminal in a buffer queue of a router, where the user terminal transmits the first communication data packet based on the first quality of service parameter;

determine a second queue delay of a second communication data packet received from the user terminal in the buffer queue of the router, where the user terminal transmits the second communication data packet based on the first quality of service parameter, and the first communication data packet is transmitted immediately after the second communication data packet is transmitted;

adjust the first quality of service parameter based on the first queue delay, the second queue delay and a reception data volume of the server, to obtain a second quality of service parameter, where the reception data volume is a data volume of the first communication data packet or a data volume received by the server from the user terminal in a specified time interval; and transmit the second quality of service parameter to the user terminal, such that the user terminal transmits subsequent communication data packets based on the second quality of service parameter.

Those skilled in the art should understand that all or a part of steps for implementing the embodiments described above may be performed by hardware, or may be performed by related hardware which is instructed by programs. The programs may be stored in a computer readable storage medium, and the storage medium may be a read only memory, a magnetic disk or a compact disk or the like.

The preferred embodiments of the present disclosure are described above and are not intended to limit the present disclosure. Any changes, equivalent substitutions or improvements within the spirit and principles of the present disclosure fall within the protection scope of the present disclosure.

The invention claimed is:

1. A traffic control method, comprising:
    determining, by a device on a network side, a first queue delay based on transceiving time of a first communication data packet currently received from a user terminal and transceiving time of a second communication data packet received from the user terminal last time, wherein the first queue delay is queuing time of the first communication data packet in a buffer queue of a router;
    comparing the first queue delay with a second queue delay stored by the device on the network side to obtain a delay duration, the second queue delay being queuing time of the second communication data packet in the buffer queue of the router, and the delay duration being a difference between the first queue delay and the second queue delay;
    determining that a network status of the user terminal is a normal status upon determining one of: the first queue delay is equal to the second queue delay; the first queue delay is greater than the second queue delay and the delay duration is less than a first threshold; or the first queue delay is less than the second queue delay and the delay duration is less than a second threshold;
    determining that the network status of the user terminal is an overload status in a case that the first queue delay is greater than the second queue delay and the delay duration is greater than or equal to the first threshold;
    determining that the network status of the user terminal is an idle status in a case that the first queue delay is less than the second queue delay and the delay duration is greater than or equal to the second threshold;
    predicting a network bandwidth of the user terminal based on the network status of the user terminal and a reception data volume, the reception data volume being a data volume of the first communication data packet or a data volume received by the device on the network side from the user terminal in a specified time interval;
    adjusting a first quality of service parameter based on the network status and the network bandwidth of the user terminal to obtain a second quality of service parameter, wherein the first quality of service parameter is a quality of service parameter initially set for the user terminal by the device on the network side; and
    transmitting the second quality of service parameter to the user terminal, wherein the user terminal transmits subsequent communication data packets based on the second quality of service parameter.

2. The method according to claim 1, wherein determining a first queue delay comprises:
    determining a first difference between receiving time of the first communication data packet and receiving time of the second communication data packet, as a receiving time interval;
    determining a second difference between transmitting time of the first communication data packet and transmitting time of the second communication data packet, as a transmitting time interval; and
    determining a third difference between the receiving time interval and the transmitting time interval, as the first queue delay.

3. The method according to claim 1, wherein predicting a network bandwidth of the user terminal comprises:
    dividing the data volume received by the device on the network side from the user terminal in the specified time interval by a length of the specified time interval to obtain a reference bandwidth, in a case that the reception data volume is the data volume received by the device on the network side from the user terminal in the specified time interval;
    multiplying the reference bandwidth by a first bandwidth coefficient to obtain the network bandwidth of the user terminal, in a case that the network status of the user terminal is an overload status;
    multiplying the reference bandwidth by a second bandwidth coefficient to obtain the network bandwidth of the user terminal, in a case that the network status of the user terminal is an idle status; and
    determining the reference bandwidth as the network bandwidth of the user terminal, in a case that the network status of the user terminal is a normal status.

4. The method according to claim 1, wherein the user terminal is one of a plurality of user terminals coupled to the device on the network side, and the plurality of user terminals perform network communication with the device on the network side simultaneously.

5. A traffic control apparatus applied to a device on a network side comprising a processor and a memory for storing program instructions, wherein the processor is configured to execute the program instructions to:
    determine a first queue delay based on transceiving time of a first communication data packet currently received from a user terminal and transceiving time of a second communication data packet received from the user terminal last time, wherein the first queue delay is queuing time of the first communication data packet in a buffer queue of a router;
    compare the first queue delay with a second queue delay stored by the device on the network side to obtain a delay duration, the second queue delay being queuing time of the second communication data packet in the buffer queue of the router, and the delay duration being a difference between the first queue delay and the second queue delay;
    determine that a network status of the user terminal is a normal status upon determining one of: the first queue delay is equal to the second queue delay; the first queue delay is greater than the second queue delay and the delay duration is less than a first threshold; or the first queue delay is less than the second queue delay and the delay duration is less than a second threshold;
    determine that the network status of the user terminal is an overload status in a case that the first queue delay is greater than the second queue delay and the delay duration is greater than or equal to the first threshold;
    determine that the network status of the user terminal is an idle status in a case that the first queue delay is less than the second queue delay and the delay duration is greater than or equal to the second threshold;
predict a network bandwidth of the user terminal based on the network status of the user terminal and a reception data volume, the reception data volume being a data volume of the currently received first communication data packet or a data volume received by the device on the network side from the user terminal in a specified time interval;
adjust a first quality of service parameter based on the network status and the network bandwidth of the user terminal to obtain a second quality of service parameter, wherein the first quality of service parameter is a quality of service parameter initially set for the user terminal by the device on the network side; and
transmit the second quality of service parameter to the user terminal, wherein the user terminal transmits subsequent communication data packets based on the second quality of service parameter.

6. The apparatus according to claim 5, wherein the processor is further configured to execute the program instructions to:
determine a first difference between receiving time of the first communication data packet and receiving time of the second communication data packet, as a receiving time interval;
determine a second difference between transmitting time of the first communication data packet and transmitting time of the second communication data packet, as a transmitting time interval; and
determine a third difference between the receiving time interval and the transmitting time interval, as the first queue delay.

7. The apparatus according to claim 5, wherein the processor is further configured to execute the program instructions to:
divide the data volume received by the device on the network side from the user terminal in the specified time interval by a length of the specified time interval to obtain a reference bandwidth, in a case that the reception data volume is the data volume received by the device on the network side from the user terminal in the specified time interval;
multiply the reference bandwidth by a first bandwidth coefficient to obtain the network bandwidth of the user terminal, in a case that the network status of the user terminal is an overload status;
multiply the reference bandwidth by a second bandwidth coefficient to obtain the network bandwidth of the user terminal, in a case that the network status of the user terminal is an idle status; and
determine the reference bandwidth as the network bandwidth of the user terminal, in a case that the network status of the user terminal is a normal status.

8. The apparatus according to claim 5, wherein the user terminal is one of a plurality of user terminals coupled to the device on the network side, and the plurality of user terminals are configured to perform network communication with the device on the network side simultaneously.

9. A server connected to a user terminal over a network, wherein the server comprises a memory and a processor, the memory stores programs, and the processor executes the programs to:
initially set a first quality of service parameter for the user terminal;
determine a first queue delay of a first communication data packet received from the user terminal in a buffer queue of a router, wherein the user terminal transmits the first communication data packet based on the first quality of service parameter;
determine a second queue delay of a second communication data packet received from the user terminal in the buffer queue of the router, wherein the user terminal transmits the second communication data packet based on the first quality of service parameter, and the first communication data packet is transmitted immediately after the second communication data packet is transmitted;
compare the first queue delay with the second queue delay to obtain a delay duration, the delay duration being a difference between the first queue delay and the second queue delay;
determine that a network status of the user terminal is a normal status upon determining one of: the first queue delay is equal to the second queue delay; the first queue delay is greater than the second queue delay and the delay duration is less than a first threshold; or the first queue delay is less than the second queue delay and the delay duration is less than a second threshold;
determine that the network status of the user terminal is an overload status in a case that the first queue delay is greater than the second queue delay and the delay duration is greater than or equal to the first threshold;
determine that the network status of the user terminal is an idle status in a case that the first queue delay is less than the second queue delay and the delay duration is greater than or equal to the second threshold;
predict a network bandwidth of the user terminal based on the network status of the user terminal and a reception data volume, the reception data volume being a data volume of the currently received first communication data packet or a data volume received by the device on the network side from the user terminal in a specified time interval;
adjust the first quality of service parameter based on the network status and the network bandwidth of the user terminal, to obtain a second quality of service parameter; and
transmit the second quality of service parameter to the user terminal, wherein the user terminal transmits subsequent communication data packets based on the second quality of service parameter.

* * * * *